(12) United States Patent
Kohama et al.

(10) Patent No.: US 7,015,676 B2
(45) Date of Patent: Mar. 21, 2006

(54) BATTERY CONTROL APPARATUS

(75) Inventors: Hirofumi Kohama, Toyota (JP); Hiroaki Yoshida, Okazaki (JP); Nobuya Furukawa, Toyokawa (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/389,774

(22) Filed: Mar. 18, 2003

(65) Prior Publication Data

US 2003/0231005 A1 Dec. 18, 2003

(30) Foreign Application Priority Data

Mar. 18, 2002 (JP) ............................. 2002-074601

(51) Int. Cl.
*H02J 7/16* (2006.01)
(52) U.S. Cl. ...................................................... 320/150
(58) Field of Classification Search ................ 320/150, 320/104, 122, 149; 318/132, 134, 139; 340/636.12; 324/426
See application file for complete search history.

(56) References Cited

U.S. PATENT DOCUMENTS

| 5,561,362 | A | * | 10/1996 | Kawamura et al. ......... 320/134 |
| 5,596,262 | A | * | 1/1997 | Boll ....................... 340/636.12 |
| 6,118,237 | A | * | 9/2000 | Kikuchi et al. ............. 318/139 |
| 6,275,008 | B1 | * | 8/2001 | Arai et al. ................... 320/132 |
| 6,441,586 | B1 | * | 8/2002 | Tate et al. ................... 320/132 |
| 6,608,482 | B1 | * | 8/2003 | Sakai et al. ................. 324/426 |

FOREIGN PATENT DOCUMENTS

JP 2000152420 * 5/2000

* cited by examiner

*Primary Examiner*—Pia Tibbits
(74) *Attorney, Agent, or Firm*—Birch, Stewart, Kolasch & Birch, LLP

(57) ABSTRACT

There is provided a battery control apparatus that, when the battery temperature is low, repeats the charge and discharge of a battery on a short cycle such that the state of charge (SOC) of the battery lies in the range of 30 to 40% if the present SOC is less than 50%, and repeats the charge and discharge of the battery on a short cycle such that the SOC lies in the range of 50 to 60% if the present SOC is equal to or greater than 50%, thus increasing the temperature of the battery. Therefore, it is possible to increase the battery temperature in an efficient manner, and to prevent the available input-output power of the battery from being reduced due to a decrease in the battery temperature.

6 Claims, 5 Drawing Sheets

BATTERY CONTROL APPARATUS

CROSS-REFERENCE TO THE RELATED APPLICATION

This non-provisional application incorporates by reference the subject matter of Application No. 2002-074601, filed in Japan on Mar. 18, 2002, on which a priority claim is based under 35 U.S.C. §119(a).

BACKGROUND OF THE INVENTION (1) Field of the Invention

The present invention relates to a battery control apparatus that controls the charge and discharge of a battery.

(2) Description of the Related Art

For example, in a series type hybrid vehicle equipped with a generator for driving an engine and a motor for driving the vehicle, the power generation of the generator is controlled such that the state of charge (SOC) indicating the remaining capacity of a battery is maintained in a predetermined range.

In this type of vehicle, since power from the battery drives the motor, the driving performance of the vehicle depends largely on the available input-output power of the battery. There are a variety of factors that decrease the available input-output power of the battery, and in particular, as shown in a characteristic diagram of FIG. 5, a decrease in the available input-output power of the battery caused by a decrease in battery temperature has a great influence on the driving performance of the vehicle.

Therefore, to ensure desired driving performance of the vehicle, in cold climates or the like, a heater has been used to increase the battery temperature to suppress the decrease of the available input-output power of the battery.

However, this necessitates adding parts such as the heater and thus causes such problems that the cost for manufacturing the vehicle is increased and the structure of the vehicle is complicated. Further, a part of heat generated by the heater escapes to parts other than the battery, and thus, there is room for improvement in terms of the energy efficiency.

SUMMARY OF THE INVENTION

It is therefore an object of the present invention to provide a battery control apparatus that is capable of increasing the temperature of a battery in an efficient manner to prevent the available input-output power of the battery from being reduced due to a decrease in battery temperature.

To attain the above object, the present invention provides a battery control apparatus comprising: a battery temperature detecting device that detects a temperature of a battery; a state-of-charge determining device that determines a state of charge of the battery; and a battery charge-discharge control device that controls charge-discharge of the battery; wherein the battery charge-discharge control device is operable when the temperature of the battery detected by the battery temperature detecting device is equal to or less than a predetermined temperature and the state of charge of the battery determined by the state-of-charge determining device is equal to or greater than a threshold set in advance, for repeating charge and discharge of the battery such that the state of charge lies in a first predetermined range equal to or greater than the threshold.

For example, the threshold valve can be about 50% of the full charge of a battery and the state of charge is about 50% to 60% of the full charge of the battery.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

A description will now be given of a battery control apparatus provided in a series type hybrid vehicle according to an embodiment of the present invention with reference to the accompanying drawings.

Figure 1:
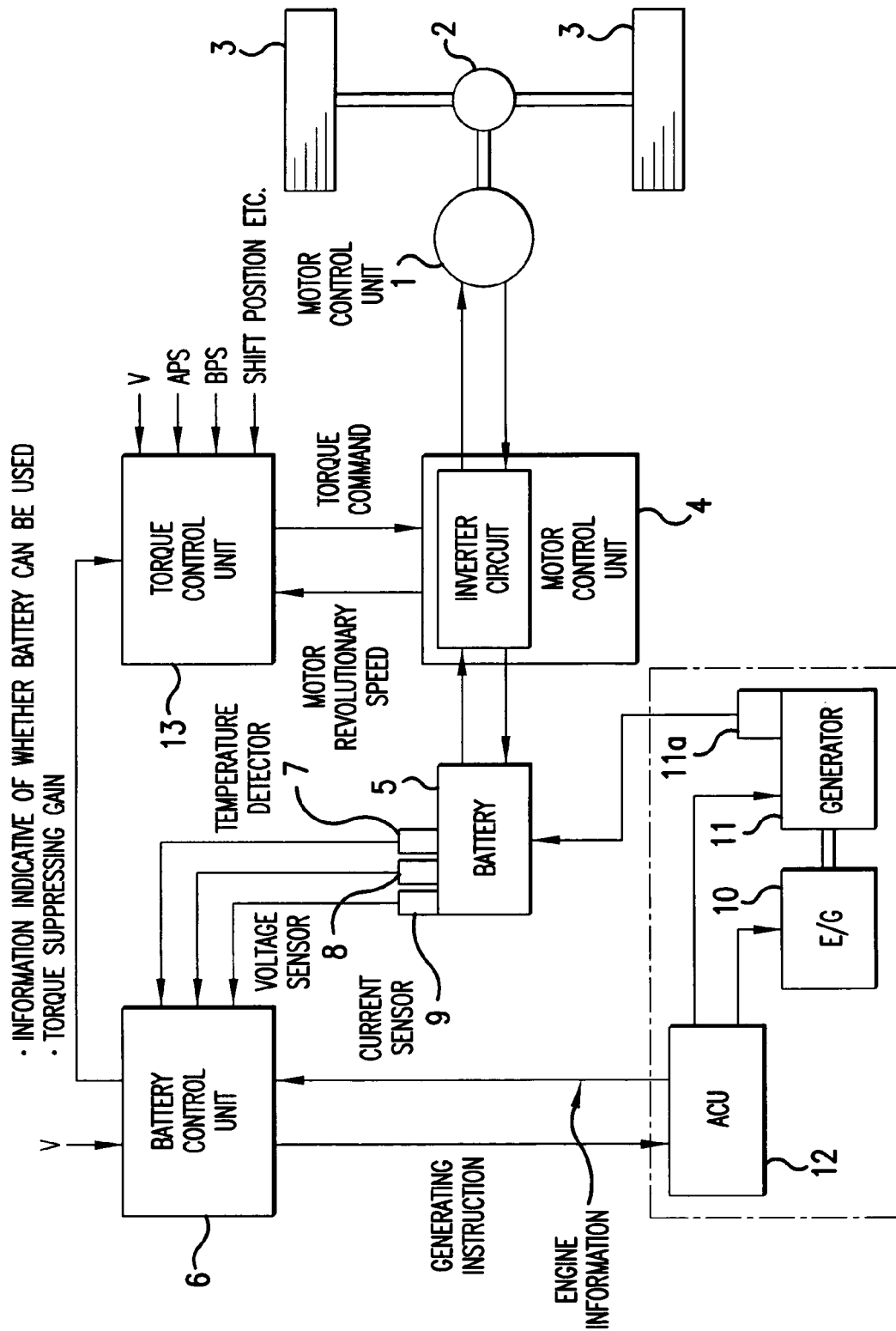
FIG. 1 is a block diagram showing the entire construction of a battery control apparatus for a series type hybrid vehicle according to an embodiment of the present invention.

FIG. 1 is a block diagram showing the entire construction of the battery control apparatus according to the present embodiment. As shown in FIG. 1, a vehicle is equipped with a motor/generator 1 that produces power for driving the vehicle, and the motor/generator 1 is connected to right and left driving wheels 3 via a differential gear 2. The motor/generator 1 is connected to a driving battery 5 via an inverter circuit incorporated in an MCU (Motor Control Unit) 4, which is connected to a BCU (Battery Control Unit) 6 via a TCU (Torque Control Unit) 13. The BCU 6 causes the TCU 13 to calculate motor torque, and the MCU 4 is driven in accordance with an instruction given from the TCU 13. With this arrangement, the supply of power from the battery 5 to the motor/generator 1, and the regeneration of power from the motor/generator 1 to the battery 5 are controlled.

The battery 5 is provided with a temperature sensor (battery temperature detecting device) 7 that detects the battery temperature Tbat, a voltage sensor 8 that detects the battery voltage Bbat, and a current sensor 9 that detects the discharge current or charge current Ibat of the battery 5, and information supplied from these sensors is inputted to the BCU 6. The accel pedal stroke APS detected by an accel sensor, not shown, and the brake pedal stroke BPS detected by a brake sensor, not shown, are inputted to the TCU 13. The TCU 13 then calculates motor torque and outputs a command indicative of the calculated motor torque to the MCU 4, and the MCU 4 calculates motor driving current.

Further, a generator 11 is connected to an engine 10 that produces power for driving the vehicle. The engine 10 rotates the generator 11, and alternating power generated by the rotation is rectified by a rectifier 11a to charge the battery 5. The engine 10 and the generator 11 are connected to an ACU (Auxiliary Control Unit) 12. The ACU 12 carries out intercommunication with the BCU 6, and controls the generating state of the generator 11 in accordance with a generating instruction inputted from the BCU 6.

The hybrid vehicle is driven under the control of the TCU 13. For example, when the vehicle is running, the TCU 13 drives the MCU 4 according to the required motor torque calculated from the accel pedal stroke APS to supply power from the battery 5 to the motor/generator 1, so that the required motor torque can be transmitted to the driving wheels 3. When the vehicle is decelerating, the TCU 13 causes the MCU 4 to charge the battery 5 with power generated in the motor/generator 1 by regenerative braking (regeneration control device).

On the other hand, the BCU 6 finds the SOC representing the remaining capacity of the battery 5 from detection information Bbat and Ibat supplied from the voltage sensor 8 and the current sensor 9 (stage-of-charge determining device). According to the SOC, the BCU 6 causes the ACU 12 to control the generating state of the generator 11 to regulate the SOC of the battery 5 (battery charge-discharge control device). The battery 5 is controlled in accordance with a battery control routine in FIGS. 2 and 3, and the outline thereof will be given below.

Figure 2:
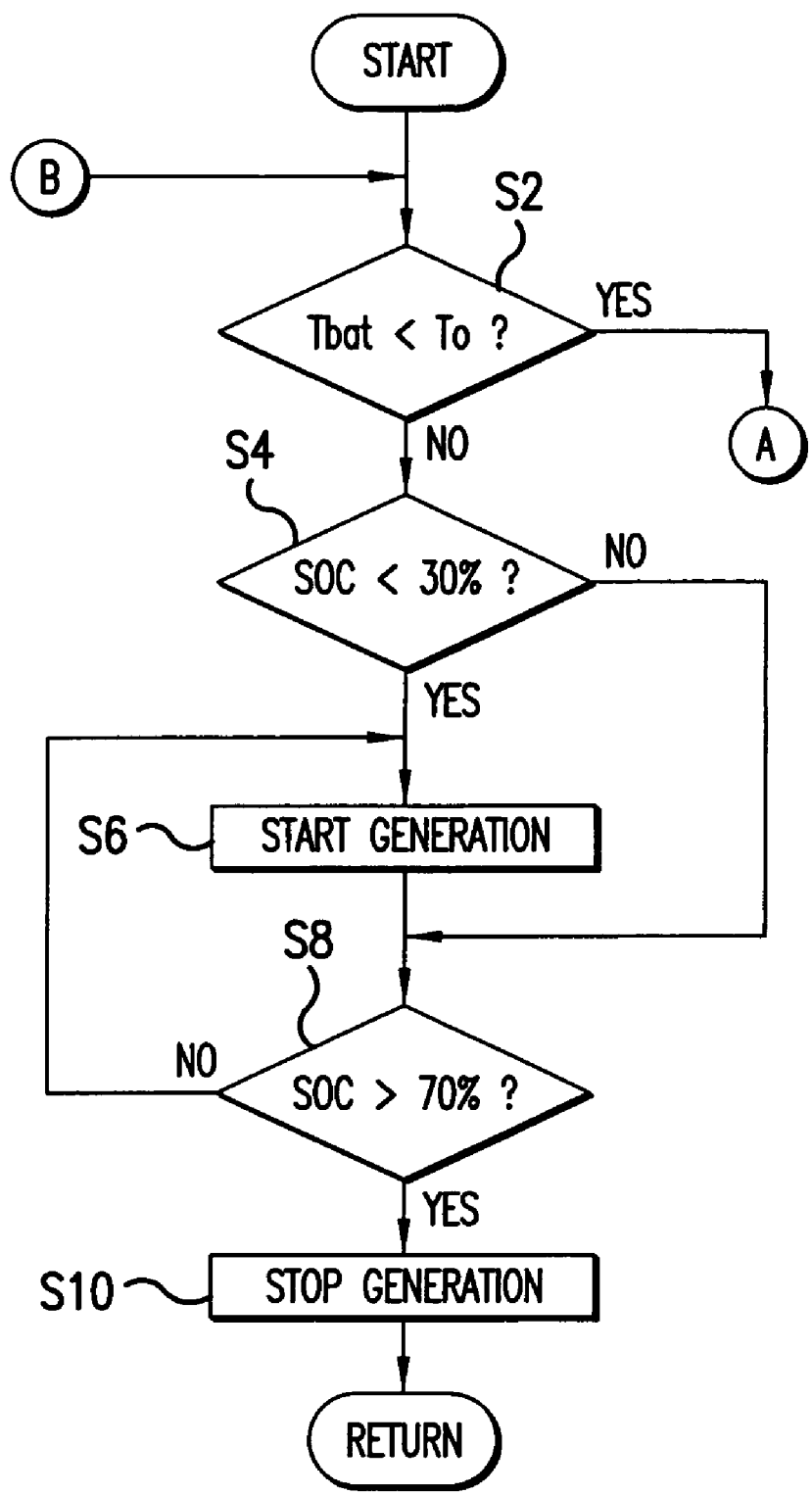
FIG. 2 is a flow chart showing a battery control routine executed by an ECU.
Figure 3:
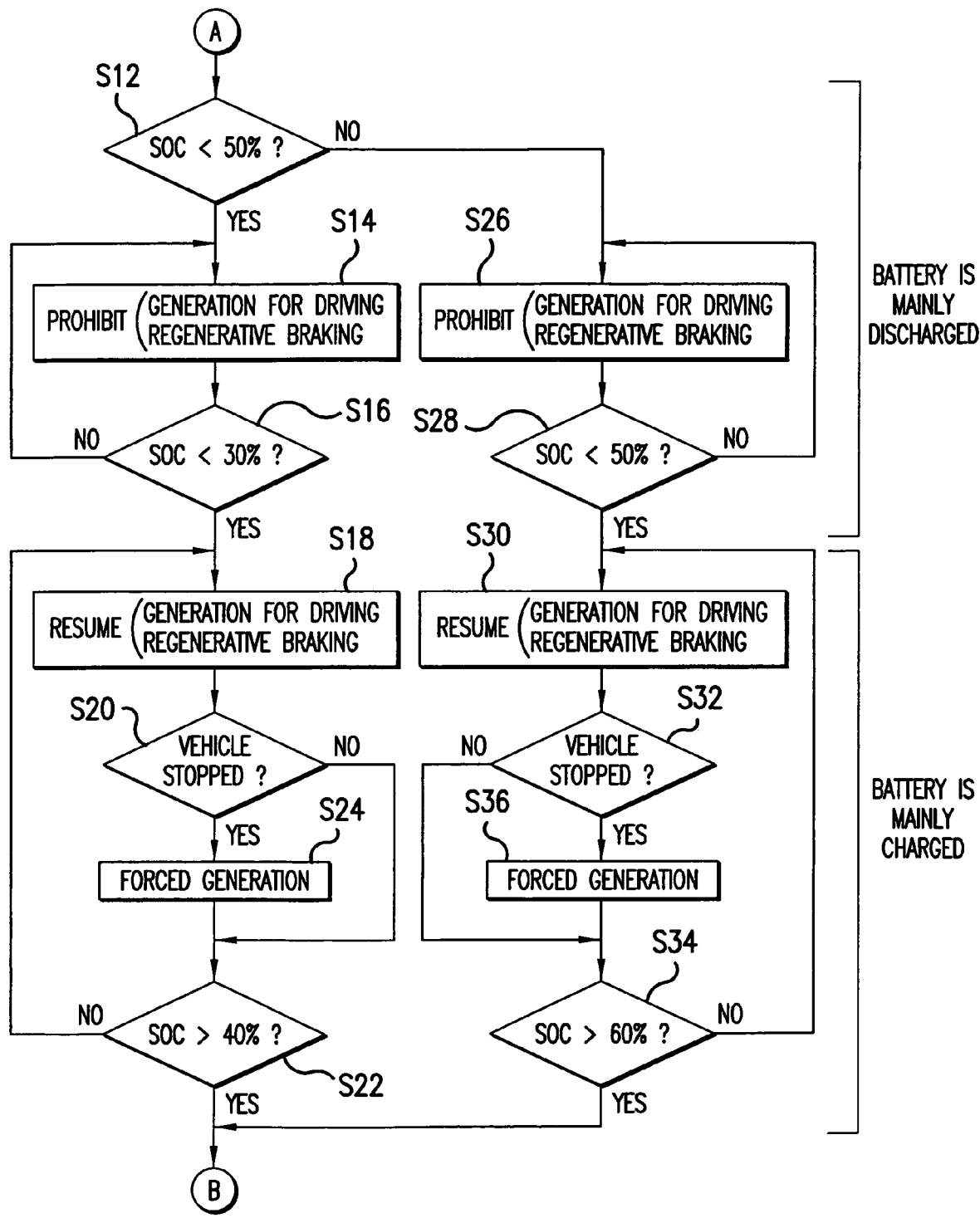
FIG. 3 is a flow chart showing the battery control routine executed by the ECU.
Figure 5:
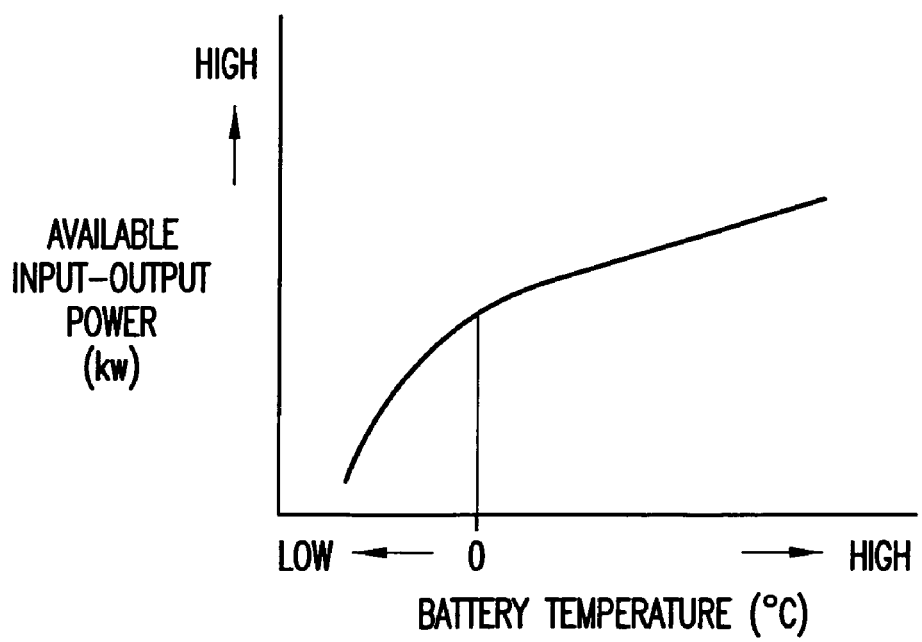
FIG. 5 is a characteristic diagram showing the relationship between the remaining battery capacity and the battery temperature.

The BCU 6 executes the routine in FIGS. 2 and 3 at predetermined control intervals. First, in Step S2, it is determined whether the battery temperature Tbat detected by the temperature sensor 7 is less than a predetermined temperature T0 or not. The predetermined temperature is set to such a temperature that is assumed to have an adversary effect on the battery capacity, and is set to 0° C., for example, according to a characteristic diagram of FIG. 5.

If the determination result in the Step S2 is negative (NO), the process proceeds to Step S4 and the subsequent steps to perform processing in a normal mode. In the Step S4, it is determined whether the SOC is less than 30% or not, and if the determination result is positive (YES), i.e. if the remaining capacity of the battery 5 is small, the process proceeds to Step S6 wherein an instruction for starting the generation is outputted to the ACU 12 to start generating power. Then, in Step S8, it is determined whether the SOC is greater than 70% or not, and if the determination result is negative (NO), the process returns to the Step S6. If the SOC of the battery 5 gradually increases to become greater than 70% as a result of the continuation of generation, the determination result in the Step S8 is positive (YES). The process then proceeds to Step S10 wherein an instruction for stopping the generation is outputted to the ACU 12 to stop generating power, and this routine is terminated.

If the process then proceeds to the Step S4, the determination result is negative (NO), and thus, the process proceeds directly to the Step S8. Since the determination result in the Step S8 is positive (YES), this routine is terminated after the Step S10 is executed. In this way, when the temperature of the battery 5 is normal, the SOC of the battery 5 is maintained in a predetermined range (30 to 70%) as is the case with conventional hybrid vehicles.

On the other hand, if the determination result in the Step S2 is positive (YES), the process proceeds to Step S12 and the subsequent steps to perform processing in a temperature increase mode intended for increasing the temperature of the battery 5. First, in Step S12, it is determined whether the SOC is less than 50% or not, and if the determination result is positive (YES), the process proceeds to Step S14 wherein the generation for driving and the regenerative braking are prohibited. Specifically, even if the generator 11 is driven to generate power for compensating the battery consumption caused the driving of the vehicle, the BCU 6 outputs an instruction for stopping the generation to the ACU 12 to stop generating power, and even if the regenerative braking of the motor/generator 1 is carried out with the deceleration of the vehicle, the BCU 6 transmits a signal for suppressing torque during the regenerating braking to the TCU 13, thus inhibiting the TCU 13 from outputting a command indicative of regenerative torque to the MCU 4. Therefore, the battery 5 is not charged by regenerative power, and as a result, the battery 5 continues discharging each time the motor is driven.

In the next Step S16, it is determined whether the SOC is less than 30% or not. If the determination result is negative (NO), the process returns to the Step S14. If the determination result is positive (YES) due to the discharge of the battery 5, the process proceeds to Step S18 to resume the above described driving generation and the regenerative generation. Therefore, the battery 5 is properly charged by the generation and regenerative braking of the generator 1. Then, in Step S20, it is determined whether the vehicle has stopped or not is determined according to the vehicle speed V. If the determination result in the Step S20 is negative (NO), the process proceeds to Step S22 wherein it is determined whether the SOC is greater than 40% or not. If the determining result in the Step S22 is negative (NO), the process returns to the Step S18.

If it is determined in the Step S20 that the vehicle has stopped, i.e. if the determination result in the Step S20 is positive (YES), the process proceeds to Step S24 wherein an instruction for starting the generation is outputted to the ACU 12, so that the ACU 12 is forced to start generating power and charge the battery 5 with the generated power. Since the battery 5 is continuously charged by the processing in the Step S24, the SOC is promptly increased. When the determination result in the Step S22 is positive (YES), the BCU 6 terminates this routine.

Figure 4:
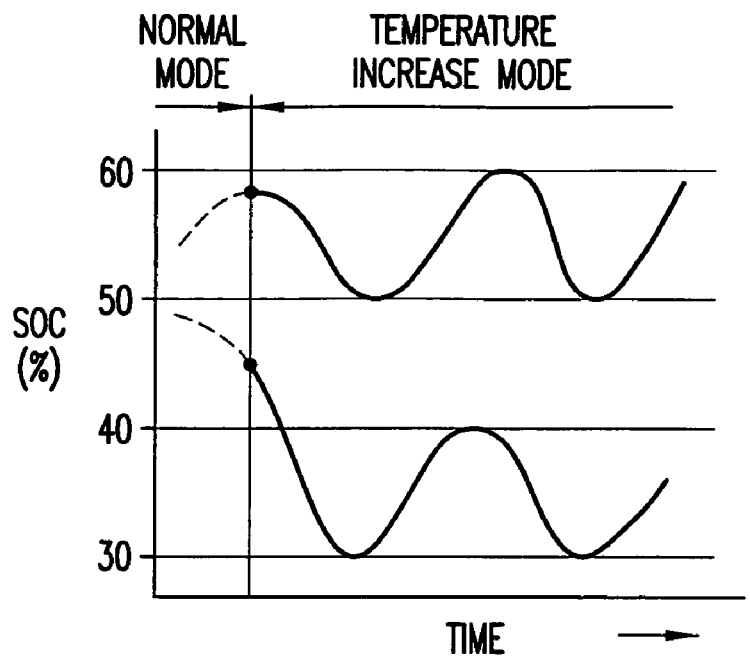
FIG. 4 is a time chart showing how the SOC is controlled when the battery temperature is low.

Thus, if the SOC is less than 50% at a time point when it is determined in the Step S2 that the temperature of the battery 5 is low, a state in which the battery 5 is continuously charged and a state in which the battery 5 is continuously discharged are repeated alternately on a short cycle such that the SOC is mainlined in the range of 30 to 40%, that is, the SOC varies in the range of 30 to 40% as shown in FIG. 4.

On the other hand, if it is determined in the Step S12 that the SOC is equal to or greater than 50%, i.e. the determination result in the Step S12 is negative (NO), the process proceeds to Step S26 wherein the generation for driving and the regenerative braking are prohibited as in the step S14. In the next Step S28, it is determined whether the SOC is less than 50% or not. Since the determination result in the Step S28 is negative (NO) at the beginning, the process returns to the Step S26 to repeat the above processing. If the determination result in the Step S28 is positive (YES) as a result of the continuation of discharging, the process proceeds to Step S30 wherein the generation for driving and the regenerative generation are resumed as in the Step S18. In the next Step S32, it is determined whether the vehicle is at a standstill or not. If the determination result in the Step S32 is negative (NO), the process proceeds to Step S34 wherein it is determined whether the SOC is greater than 60% or not. If the determination result in the Step S34 is negative (NO), the process returns to the Step S30.

If it is determined in the Step S32 that the vehicle is at a standstill, i.e. if the determination result is positive (YES), the process proceeds to Step S36 wherein the ACU 12 is forced to generate power to charge the battery 5 as in the Step S24. When the determination result in the Step S34 is positive (YES), this routine is terminated.

Thus, if the SOC is equal to or greater than 50%, the charge and discharge of the battery 5 are repeated alternately on a short cycle such that the SOC is maintained in the range of 50 to 60%; that is, the SOC varies in the range of 50 to 60% as shown in FIG. 4.

Figure 6:
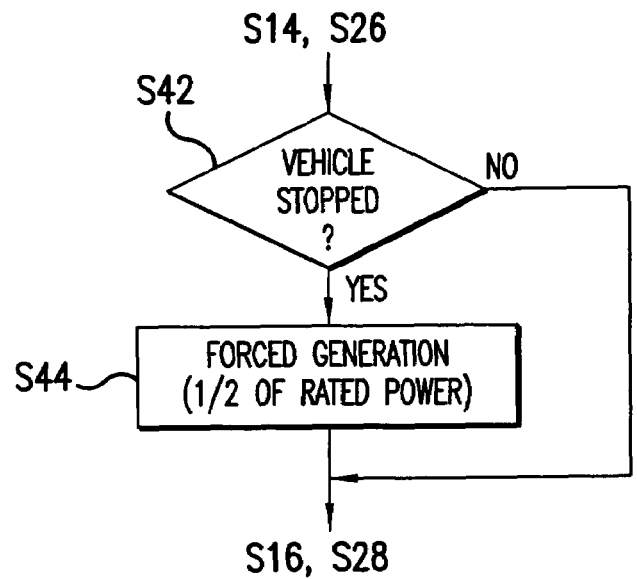
FIG. 6 is a flow chart showing an additional part of the battery control routine for forcing ½ of rated power to be generated when the vehicle is at a standstill.

It should be noted that additional steps S42 and S44 in FIG. 6 may follow each of the Steps S14 and S26. In the Step S42, it is determined whether the vehicle has stopped or not, and only if it is determined that the vehicle has stopped, the process proceeds to Step S44 wherein the engine 10 is started to force the generator 11 to be driven.

If the vehicle continues to be at a standstill for a long period of time, the charge or discharge of the battery 5 does not occur, and current is not inputted to or outputted from the battery 5, making it difficult to increase the battery temperature. However, even in the state in which the battery 5 is controlled to be mainly discharged, if it is determined that the vehicle has stopped, the battery 5 is charged (the flow of current is produced) by driving the generator 11, so that the battery temperature can be constantly increased. However, since the battery 5 is being controlled to be discharged, it is preferred that the generator 11 is operated to generate ½ of rated power. Since the above described problems are encountered while the vehicle is at a standstill although the SOC should be promptly lowered while the battery 5 is controlled to be discharged, the generator 11 is operated to generate ½ of rated power so that the SOC can be lowered and the joule heat may be utilized at the same time.

As described above, when the battery temperature is less than 0° C. that is assumed to cause troubles due to a decreased in, the available input-output power of the battery 5, the charge and discharge of the battery 5 are repeated alternately on a short cycle in the temperature increase mode. As a result, it is possible to promptly increase the temperature of the battery 5, and to prevent the battery capacity from being reduced due to a decrease in the battery temperature.

Further, as described above, the upper and lower ranges (i.e. the upper range of 30 to 40% and the lower range of 50 to 60%) are specified with the boundary being set to 50%, and one of the ranges to which the SOC is closer at a time point when it is determined that the battery temperature is low is selected so that the SOC can be varied within the selected range. Specifically, if the present SOC is equal to or greater than 50%, the SOC can immediately start varying in the selected range, and if the present SOC is less than 50%, the SOC can start varying in the selected range shortly after it has been lowered to 40% as a result of the discharge. This also contributes to the acceleration of the battery temperature increase.

Further, since the temperature of the battery 5 is increased directly by using the internal resistance of the battery 5 occurring during charge and discharge, the battery temperature can be increased in an extremely efficient manner without causing no power loss occurs as is distinct form the heater of the above described prior art, for example, and the battery control apparatus can be implemented by simply changing software of the BCU 6 without adding a special heater or the like.

It should be understood that the present invention is not limited to the embodiment disclosed, but various variations of the above described embodiment may be possible without departing from the spirits of the present invention, including variations as described below, for example.

Although in the above described embodiment, the battery control apparatus is applied to the series type hybrid vehicle, the present invention is not limited to this, but the battery control apparatus may be applied to a series-parallel type hybrid vehicle whose engine is not only used for generation but used for driving, or to ones other than vehicles, such as a battery for a generator used for construction or the like. Further, although in the above described embodiment, all equipment is provided in the vehicle, the present invention is not limited to this, but the ACU 12, engine 10, and generator 11 may be separated as a nit from the main body of the vehicle to construct a generating trailer towed by the vehicle (as indicated by the alternate long and short dash line in FIG. 1).

Figure 7:
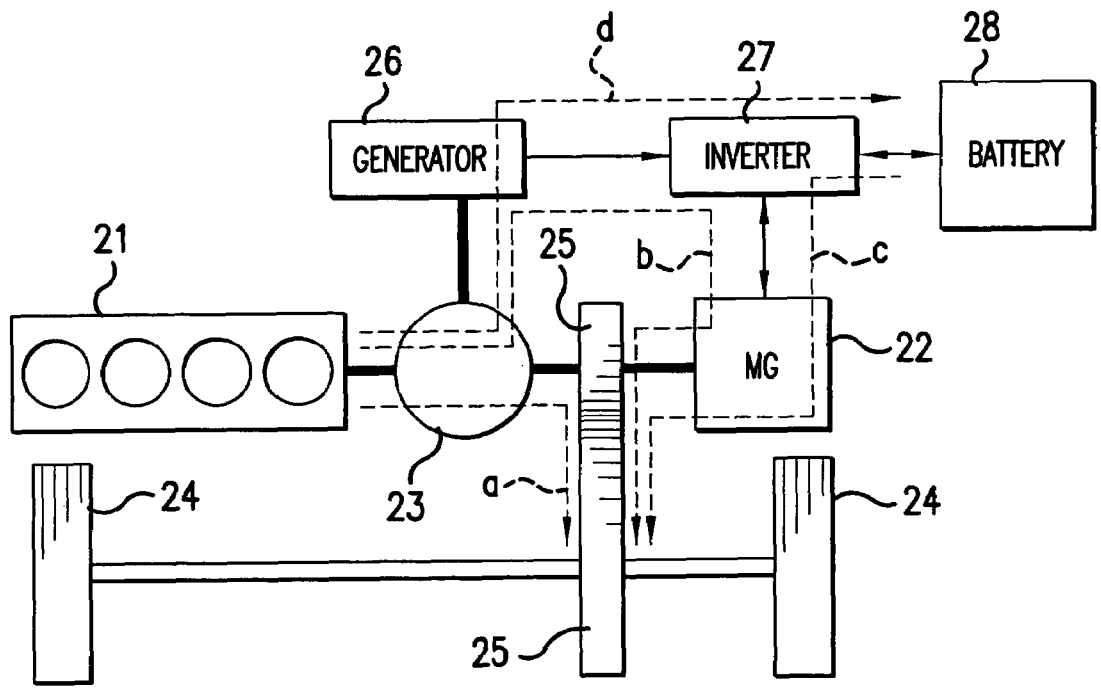
FIG. 7 is a block diagram showing the entire construction of a series-parallel type hybrid vehicle.

A description will now be given of the outline of the example in which the present invention is applied to the series-parallel type hybrid vehicle. As shown in FIG. 7, the vehicle is provided with an engine 21 that produces power for driving the vehicle, as well as a motor/generator 21. The engine 21 is connected to a power distributing device 23, which distributes engine power to a gear 25 of driving wheels 24 and to a generator 26 at an arbitrary ratio. The generator 26 is electrically connected to the motor/generator 22 and a battery 28 via an inverter circuit 27, and the motor/generator 22 is connected to the gear 25 of the driving wheels 24. The inverter circuit 27 provides control to drive the motor/generator 22 and to charge the battery 28.

For example, when the vehicle is running in a normal state, the engine 21 is operated to distribute power thereof to the driving wheels 24 (an arrow a in FIG. 7) and to the generator 26 to drive the motor/generator 22 by the generated power (indicated by an arrow b), so that the vehicle can be driven by the engine 21 and the motor/generator 22. When the vehicle is started or is running at a low speed, the engine 21 is stopped, and the motor/generator 22 is driven by power of the battery 28 to drive the vehicle (an arrow c in FIG. 7). On the other hand, when the SOC of the battery 28 becomes less than a predetermined value, the engine power is increased to charge the battery 28 with generated power increases when the vehicle is running in a normal state, and the engine 21 is started to start generating power to charge the battery 28 when the vehicle is started or is running at a low speed (an arrow d in FIG. 7).

Therefore, in the temperature increased mode when the battery temperature Tbat is low, it suffices that the generation during driving is prohibited (corresponding to the Steps S14 and S26) and is resumed (corresponding to the Steps S18 and S30). Therefore, the charge and discharge of the battery 28 are repeated alternately on a short cycle, thus making it possible to accelerate the temperature increase of the battery 28 as in the above described embodiment.

What is claimed is:

1. A battery control apparatus comprising:
   a battery temperature detecting device that detects a temperature of a battery by the direct actual temperature of the battery;
   a state-of-charge determining device that determines a state of charge of the battery; and
   a battery charge-discharge control device that controls charge-discharge of the battery;
   wherein said battery charge-discharge control device functions when the temperature of the battery detected by said battery temperature detecting device is equal to or less than a predetermined temperature and the state of charge of the battery determined by said state-of-charge determining device is equal to or greater than a threshold set in advance, for repeating charge and discharge of the battery such that the state of charge varies in a range of 50–60%, and when the state of charge of the battery is less than the threshold, for repeating charge and discharge of the battery such that the state of charge varies in a range of 30–40%.

2. The battery control apparatus according to claim 1, wherein said battery charge-discharge control device is operable when the state of charge of the battery is less than the threshold, for repeating charge and discharge of the battery such that the state of charge is at a value less than the threshold.

3. The battery control apparatus according to claim 1, wherein said predetermined temperature is about 0° C.

4. The battery control apparatus according to claim 1, wherein said threshold is about 50% of the full charge of the battery.

5. The battery control apparatus according to claim 4, wherein the value of 50 to 60% is the full charge of the battery.

6. The battery control apparatus according to claim 5, wherein said battery charge-discharge control device is operable when the state of charge of the battery is less than about 50%, for repeating charge and discharge of the battery such that the state of charge lies in the range of about 30 to 40%.

* * * * *